United States Patent
Lee et al.

(10) Patent No.: US 12,504,042 B2
(45) Date of Patent: Dec. 23, 2025

(54) PINION BEARING

(71) Applicant: BEARINGART, Gyeongju-si (KR)

(72) Inventors: Woon Ju Lee, Yongin-si (KR); Hyo Jun Song, Incheon (KR); Byung Su Ko, Yongin-si (KR); Kyu Bok Kim, Seoul (KR)

(73) Assignee: BEARINGART, Gyeongju-si (KR)

( * ) Notice: Subject to any disclaimer, the term of this patent is extended or adjusted under 35 U.S.C. 154(b) by 24 days.

(21) Appl. No.: 18/270,523

(22) PCT Filed: Dec. 30, 2021

(86) PCT No.: PCT/KR2021/020321
§ 371 (c)(1),
(2) Date: Jun. 30, 2023

(87) PCT Pub. No.: WO2022/146087
PCT Pub. Date: Jul. 7, 2022

(65) Prior Publication Data
US 2024/0060535 A1      Feb. 22, 2024

(30) Foreign Application Priority Data
Dec. 30, 2020   (KR) .......................... 10-2020-0188572

(51) Int. Cl.
*F16C 33/58*    (2006.01)
*F16C 19/38*    (2006.01)
*F16C 37/00*    (2006.01)

(52) U.S. Cl.
CPC .......... *F16C 33/586* (2013.01); *F16C 19/386* (2013.01); *F16C 37/007* (2013.01); *F16C 2361/61* (2013.01)

(58) Field of Classification Search
CPC .... F16C 19/187; F16C 19/385; F16C 19/386; F16C 19/525; F16C 33/586; F16C 37/007;
(Continued)

(56) References Cited

U.S. PATENT DOCUMENTS

| 2,480,836 A * | 9/1949 | Buckendale ........... B60K 17/16 |
| | | 74/370 |
| 4,576,503 A * | 3/1986 | Orain ...................... F16D 1/072 |
| | | 384/267 |

(Continued)

FOREIGN PATENT DOCUMENTS

| DE | 10259166 A1 * | 7/2004 | ............. F16C 19/386 |
| DE | 102013208208 A1 * | 11/2014 | .............. F16C 19/18 |

(Continued)

OTHER PUBLICATIONS

Translation of JP2002508485 obtained Nov. 14, 2024.*
Translation of DE 102013208208 obtained Apr. 11, 2025.*

*Primary Examiner* — James Pilkington
(74) *Attorney, Agent, or Firm* — Dinsmore & Shohl LLP; Yongosk Choi, Esq.

(57) ABSTRACT

Provided is a pinion bearing that may be coupled to a pinion shaft of a vehicle. The pinion bearing may include at least one inner ring mounted on and coupled to a pinion shaft; an outer ring positioned outside the inner ring in a radial direction; and a plurality of rolling elements configured to rotatably support the inner ring relative to the outer ring. The outer ring may i a flange portion formed to extend outward in the radial direction, a first extension portion formed to extend from the flange portion toward a differential gear unit, and a second extension portion formed to extend from the flange portion toward an opposite side of the differential (Continued)

gear unit, and a heat dissipation fin(s) may be formed on the second extension portion to protrude outward in the radial direction.

11 Claims, 4 Drawing Sheets

(58) Field of Classification Search
CPC ............ F16C 2361/61; F16H 57/0469; F16H 57/0471
USPC .......................................................... 384/476
See application file for complete search history.

(56) References Cited

U.S. PATENT DOCUMENTS

| | | | | |
|---|---|---|---|---|
| 4,749,288 A | * | 6/1988 | Tilch ..................... | F16C 19/386 384/585 |
| 4,824,264 A | * | 4/1989 | Hoebel ............... | F16H 57/0483 384/473 |
| 4,952,078 A | * | 8/1990 | Ankenbauer ......... | F16C 37/007 384/905 |
| 9,151,329 B2 | * | 10/2015 | Katsaros ................. | F16C 25/08 |

FOREIGN PATENT DOCUMENTS

| | | | | |
|---|---|---|---|---|
| JP | 2000283269 A | | 10/2000 | |
| JP | 2002508485 A | * | 3/2002 | |
| JP | 2006200730 A | | 8/2006 | |
| JP | 2013024353 A | * | 2/2013 | ............ F16C 19/184 |

* cited by examiner

FIG. 1

PRIOR ART

PINION BEARING

CROSS-REFERENCE TO RELATED APPLICATIONS

This application is a national phase of International Application No. PCT/KR2021/020321 filed on Dec. 30, 2021, which claims priority to Korean Patent Application No. 10-2020-0188572 filed on Dec. 30, 2020, the entire contents of which are herein incorporated by reference.

TECHNICAL FIELD

The present disclosure relates to a pinion bearing used for supporting a pinion shaft, and more particularly, to a pinion bearing configured to effectively dissipate heat generated inside the pinion bearing to an outside by forming heat dissipation fins on an outer peripheral surface of an outer ring.

BACKGROUND ART

A vehicular differential arrangement or the like is provided with a pinion shaft including a pinion gear, and a pinion gear provided on one end of the pinion shaft is coupled to a gear member of a differential gear unit to transmit power.

Figure 1:
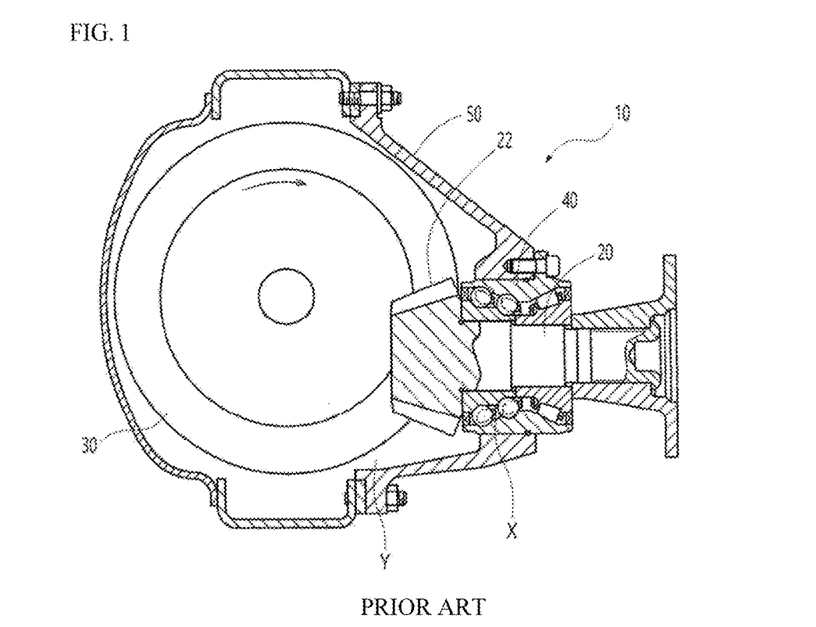
FIG. 1 exemplarily illustrates a structure of a differential arrangement of a vehicle.

For example, referring to FIG. 1, a structure of a differential arrangement of a vehicle provided with a pinion shaft is exemplarily illustrated. As illustrated in FIG. 1, a differential arrangement 10 of the vehicle is configured such that a pinion gear 22 provided on one end of a pinion shaft 20 is coupled to a gear member 30 of a differential gear unit, and the pinion shaft 20 is rotatably mounted on and supported by a casing 50 of the differential arrangement 10 via a pinion bearing 40.

Further, the pinion bearing 40 is formed in a structure in which rolling elements are interposed between an outer ring and an inner ring as in conventional bearing devices. A bearing space X in which the rolling elements are located may be lubricated with an oil that lubricates a space Y in which the gear member 30 of the differential gear unit is located. Alternatively, as illustrated in FIG. 1, the bearing space X may be separated from the space Y in which the gear member 30 of the differential gear unit is located and may be lubricated with a separate grease.

As illustrated in FIG. 1, the differential arrangement formed to be lubricated with a separate grease by unitizing the pinion bearing 40 has merits of being able to achieve the simplified structure and the reduction in weight. However, heat generated from the pinion bearing 40 may not be sufficiently released to the outside at the time of high-speed operation, which may cause matters such as thermal deformation and the like.

DISCLOSURE

Technical Problem

The present disclosure is to solve the above-mentioned matters, and the present disclosure is for the purpose of providing a pinion bearing configured to form a heat dissipation pin structure on an outer peripheral surface of an outer ring for supporting a plural rows of rolling elements so that heat generated inside the pinion bearing that is subjected to grease lubrication may be more effectively released to the outside to suppress thermal deformation.

Technical Solution

Representative configurations of the present disclosure to achieve the above objects are described below.

According to an example embodiment of the present disclosure, there may be provided a pinion bearing that may be used to a pinion shaft of a vehicle. The pinion bearing according to an example embodiment of the present disclosure may comprise: at least one inner ring mounted on and coupled to a pinion shaft; an outer ring positioned outside the inner ring in a radial direction; and a plurality of rolling elements configured to rotatably support the inner ring relative to the outer ring. According to an example embodiment of the present disclosure, the outer ring may comprise a flange portion formed to extend outward in the radial direction, a first extension portion formed to extend from the flange portion toward a differential gear unit, and a second extension portion formed to extend from the flange portion toward an opposite side of the differential gear unit, and a heat dissipation fin(s) may be formed on the second extension portion to protrude outward in the radial direction.

In an aspect, a plurality of heat dissipation fins may be provided to be spaced apart from each other along a circumferential direction of the pinion bearing.

In an aspect, the heat dissipation fin may be formed to extend from the flange portion in an axial direction.

In an aspect, the heat dissipation fin may be formed to extend from the flange portion to an axial end portion of the second extension portion.

In an aspect, a radial outer surface of the heat dissipation fin may be formed to be inclined at a predetermined angle with respect to a central axis of the pinion bearing.

In an aspect, the radial outer surface of the heat dissipation fin may be formed to be inclined at an angle of 2 degrees to 3 degrees with respect to the central axis of the pinion bearing.

In an aspect, a radial outer surface of a portion where the heat dissipation fin is not formed in the second extension portion may be formed to be inclined at a predetermined angle with respect to the central axis of the pinion bearing.

In an aspect, the radial outer surface of the portion where the heat dissipation fin is not formed in the second extension portion may be formed to be inclined at an angle of 2 degrees to 3 degrees with respect to the central axis of the pinion bearing.

In an aspect, the heat dissipation fin may be formed to extend from the flange portion to a portion between the flange portion and the axial end portion of the second extension portion.

In an aspect, the flange portion may comprise a plurality of fastening holes provided to be spaced apart from each other along the circumferential direction, and the plurality of fastening holes may be formed to penetrate in the axial direction.

In an aspect, a mounting portion may be provided around the plurality of fastening holes to protrude in the axial direction.

In an aspect, a weight reduction portion having a smaller axial thickness than the mounting portion may be provided on the flange portion.

In an aspect, a bearing space in which the plurality of rolling elements are located may be filled with a grease to provide a lubrication.

In addition, the pinion bearing according to the present disclosure may further comprise other additional configurations without departing from the technical sprit of the present disclosure.

Advantageous Effects

A pinion bearing according to an example embodiment of the present disclosure is configured to comprise heat dissipation fins formed to protrude outward in a radial direction from an outer peripheral surface of an outer ring. This makes it possible to more easily release heat generated inside the pinion bearing to the outside via the heat-dissipating pins. Therefore, even in a case of unitizing the pinion bearing to perform grease lubrication, it is possible to prevent thermal deformation or the like from occurring in the pinion bearing.

EXPLANATION OF REFERENCE NUMERALS

100: Differential arrangement
200: Pinion shaft
210: Pinion gear
300: Differential gear unit
310: Gear member
320: Case
400: Pinion bearing
410: Inner ring 410a: a first inner ring 410b: a second inner ring
420: Outer ring
430: Rolling element 430a: a first row of rolling elements 430b: a second row of rolling elements
440: Sealing member
450: Flange portion
452: Fastening hole
454: Mounting portion
456: Weight reduction portion
460: First extension portion
470: Second extension portion
480: Heat-dissipating fin
500: Yoke flange
600: Fastening member

DETAILED DESCRIPTION

Example embodiments of the present disclosure described herein are exemplified for the purpose of explaining the technical spirit of the present disclosure. The scope of the claims according to the present disclosure is not limited to the example embodiments described below or to the detailed descriptions of these example embodiments.

Unless otherwise defined, all technical and scientific terms used herein have the same meaning commonly understood by those skilled in the art to which the present disclosure pertains. All terms used herein are selected for the purpose of more clearly describing the present disclosure and not limiting the scope of the present disclosure.

Unless the phrase or sentence clearly indicates otherwise, terms "comprising," "including," "having," and the like used herein may be construed as open-ended terms encompassing the possibility of including other embodiments.

The singular form described herein may include the plural form unless the context clearly dictates otherwise, and this is equally applied to the singular form set forth in the claims.

Throughout the present specification, the term "axial direction" may be defined as a direction along a central axis of a pinion bearing, the term "radial direction" may be defined as a direction perpendicular to the axial direction and away from the central axis or approaching the central axis, and the term "circumferential direction" may be defined as a direction rotating about the central axis.

Throughout the present specification, when a constituent element is referred to as being "positioned" or "formed" at one side of another constituent element, the constituent element may be in direct contact with the one side of another constituent element, or may be positioned or formed at another constituent element by intervening yet another constituent element therebetween.

Hereinafter, example embodiments of the present disclosure will be described in detail with reference to the accompanying drawings at such an extent that they may be readily practiced by those ordinary skilled in the art. In the accompanying drawings, the same reference numerals are assigned to the same or corresponding constituent elements. Further, in the following descriptions of the embodiments, duplicate descriptions of the same or corresponding constituent elements may be omitted. However, even though descriptions of a specific constituent element are omitted, such a constituent element is not intended to be excluded in a respective example embodiment.

Referring to FIGS. 2 to 5, structures of a pinion bearing according to an example embodiment of the present disclosure and a differential arrangement including the pinion bearing are exemplarily illustrated. As described later, the pinion bearing according to an example embodiment of the present disclosure may be configured to be separated from a differential gear unit to perform a separate grease lubrication, and may be configured to provide a heat dissipation fin(s) formed to be protruded radially outward from an outer peripheral surface of an outer ring to improve heat-dissipation capability.

Similarly to conventional differential arrangements for a vehicle, a differential arrangement 100 according to an example embodiment of the present disclosure may be configured to comprise a pinion shaft 200, a differential gear unit 300 connected to the pinion shaft 200, a pinion bearing 400 for rotatably supporting the pinion shaft 200, and the like. A yoke flange 500 may be mounted on an end portion of the pinion shaft 200 to that transmit a rotational force of the pinion shaft 200 to a yoke or the like, and the yoke flange 500 may be fixed to the pinion shaft 200 with a fastening member 600 such as a nut.

According to an example embodiment of the present disclosure, the pinion shaft 200 may be formed in a approximately cylindrical structure that extends in the axial direction. A pinion gear 210 may be provided on one end portion of the pinion shaft 200, and the pinion gear 210 may be connected to a gear member 310 of the differential gear unit 300.

According to an example embodiment of the present disclosure, the pinion shaft 200 may be configured to be rotatably supported by a casing 320 of the differential gear unit 300 or the like via the pinion bearing 400, which will be described later.

According to an example embodiment of the present disclosure, similarly to conventional bearing devices, the pinion bearing 400 may comprise a plurality of rolling elements 430 provided between an inner ring 410 and an outer ring 420 to perform a function of rotatably supporting the inner ring 410 with respect to the outer ring 420.

According to an example embodiment of the present disclosure, at least one inner ring 410 may be mounted on the pinion shaft 200 to support the rolling elements 430 from a radially inward direction.

For example, in the case of the example embodiment illustrated in the drawings, a first inner ring 410a that supports a first row of rolling elements 430a and a second inner ring 410b that supports a second row of rolling elements 430b are configured to be coupled with an outer peripheral surface of the pinion shaft 200.

According to an example embodiment of the present disclosure, the outer ring 420 may be mounted outward of the inner ring 410 in the radial direction to perform a function of supporting the rolling elements 430 from a radially outward direction.

According to an example embodiment of the present disclosure, the rolling elements 430 may perform a function of rotatably supporting the inner ring 410 of the pinion bearing 400 and the pinion shaft 200 on which the inner ring 410 is mounted relative to the outer ring 420 of the pinion bearing 400 and the casing 320 to which the outer ring 420 is fixed. As illustrated in the drawings, the rolling elements 430 may be formed of rolling members such as tapered rollers.

According to an example embodiment of the present disclosure, a bearing space portion in which the rolling elements 430 are arranged may be filled with a grease to assist a rotational motion of the rolling elements 430. Sealing members 440 may be provided on both axial end portions of the bearing space portion to prevent the grease filled in the bearing space portion from leaking out or prevent external foreign matters from entering the bearing space portion.

According to an example embodiment of the present disclosure, the outer ring 420 may comprise a flange portion 450 formed to extend outward in the radial direction from an outer peripheral surface of the outer ring 420. The outer ring 420 may be fixedly mounted on the casing 320 of the differential gear unit 300 or the like via the flange portion 450.

For example, according to an example embodiment of the present disclosure, the flange portion 450 of the outer ring 420 may comprise a plurality of fastening holes 452 provided to be spaced apart from each other along a circumferential direction. The outer ring 420 may be fixed to the casing 320 of the differential gear unit 300 or the like by coupling a bolt member or the like to each fastening hole 452.

According to an example embodiment of the present disclosure, a mounting portion 454 may be provided around each fastening hole 452 provided in the flange portion 450 of the outer ring 420 to protrude in the axial direction rather than other portions. This secures rigidity for the mounting of the bolt members.

According to an example embodiment of the present disclosure, the mounting portion 454 may be partially formed around each fastening hole 452, and a weight reduction portion 456 having a smaller axial thickness than the mounting portion may be provided outside of the mounting portion 454.

As described above, when the flange portion 450 is formed such that the mounting portion 454 having a partially thick thickness in the axial direction is formed merely around the fastening holes 452 to which the bolt members are coupled, and the other portions of the flange portion 450 has a relatively thin thickness in the axial direction is formed on other portions, it possible to reduce the overall weight of the outer ring 420 and achieve weight-lightening while securing the rigidity necessary for fastening the outer ring 420.

According to an example embodiment of the present disclosure, the outer ring 420 of the pinion bearing 400 may be provided with a first extension portion 460 formed to extend to one side of the flange portion 450 in the axial direction (an extension portion extending toward the differential gear unit), and a second extension portion 470 formed to extend to the other side of the flange portion 450 in the axial direction (an extension portion extending toward the opposite side of the differential gear unit).

According to an example embodiment of the present disclosure, the first extension 460 provided on the outer ring 420 of the pinion bearing 400 may be formed in an approximately cylindrical structure, and may be inserted into and coupled to the casing 320 of the differential gear unit 300 or the like.

According to an example embodiment of the present disclosure, the second extension portion 470 provided on the outer ring 420 of the pinion bearing 400 may be formed in an approximately cylindrical structure. A heat dissipation fin(s) 480 formed to protrude outward in the radial direction may be provided on an outer peripheral surface of the second extension portion 470.

According to an example embodiment of the present disclosure, the heat dissipation fin 480 may be formed to extend along the axial direction from the flange portion 450 of the outer ring 420. One or more heat dissipation fins 480 may be formed to be spaced apart from each other along the circumferential direction (preferably, a plurality of heat dissipation fins may be provided along the circumferential direction).

Figure 2:
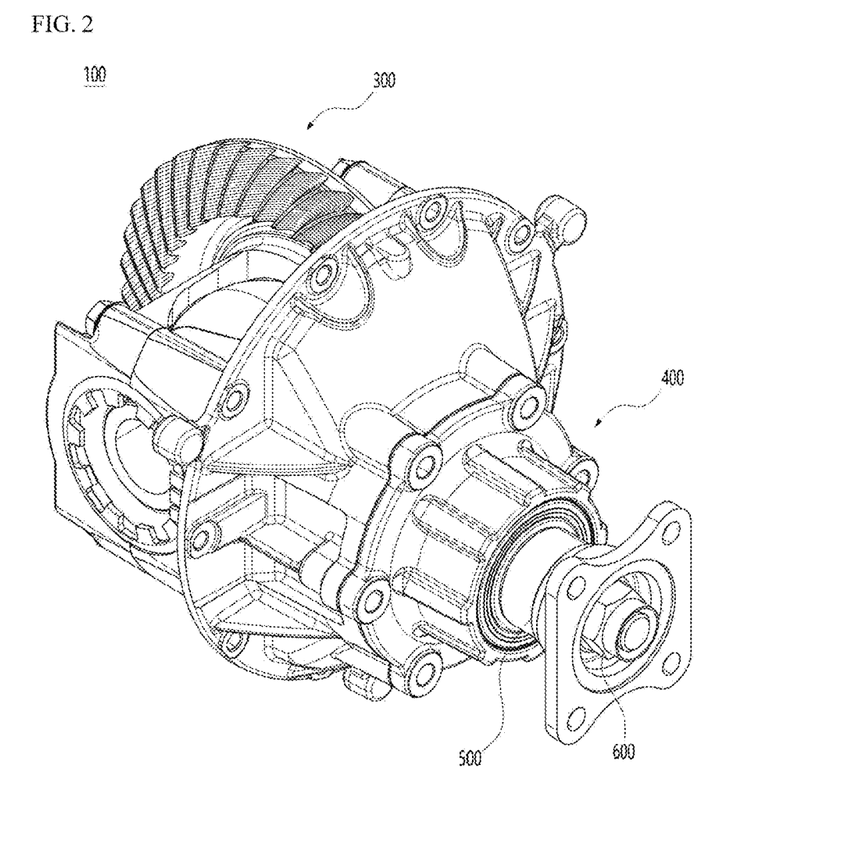
FIG. 2 exemplarily shows a structure of a differential arrangement according to an example embodiment of the present disclosure.
Figure 3:
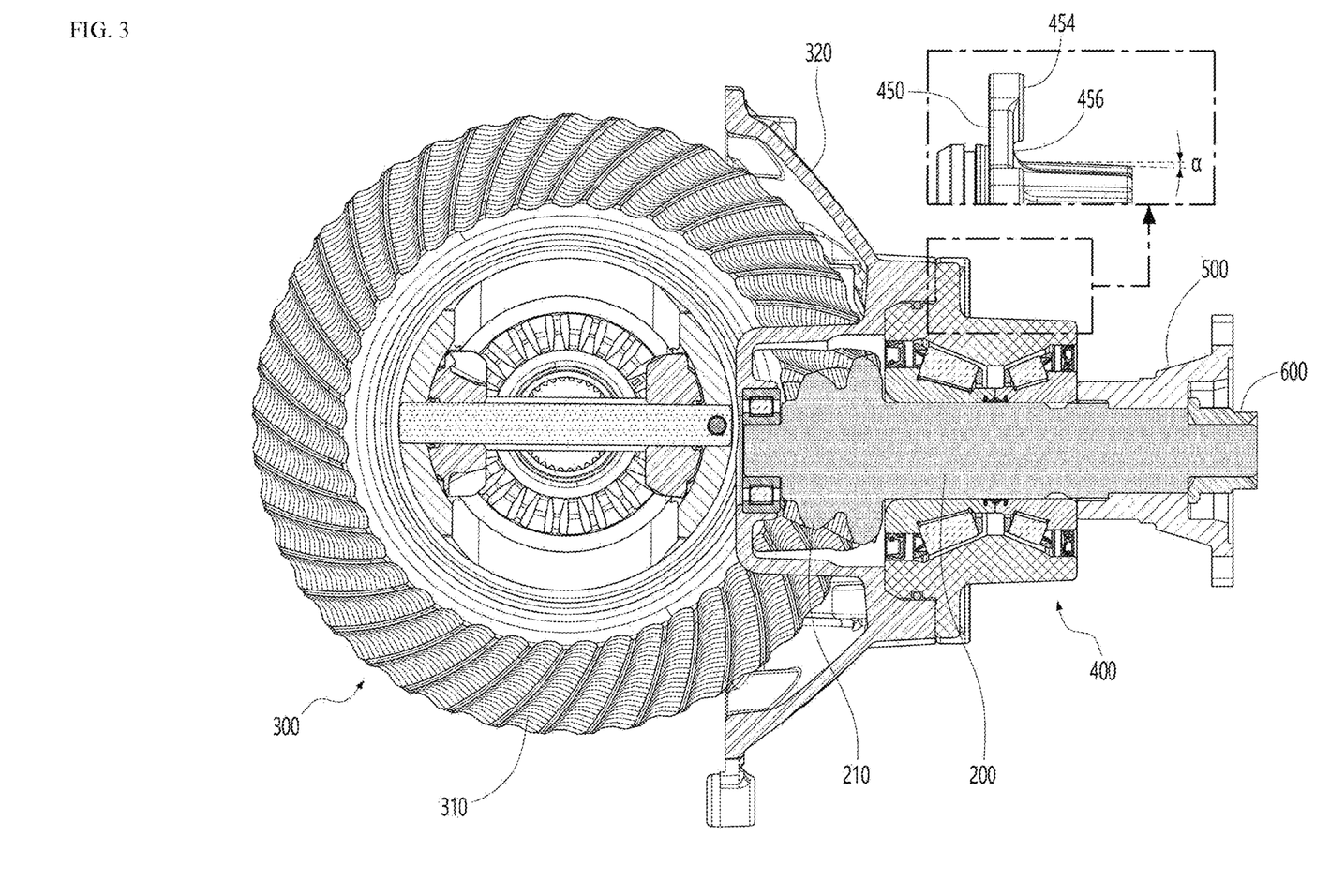
FIG. 3 exemplarily illustrates a cross-sectional structure of the differential arrangement according to an example embodiment of the present disclosure.
Figure 4:
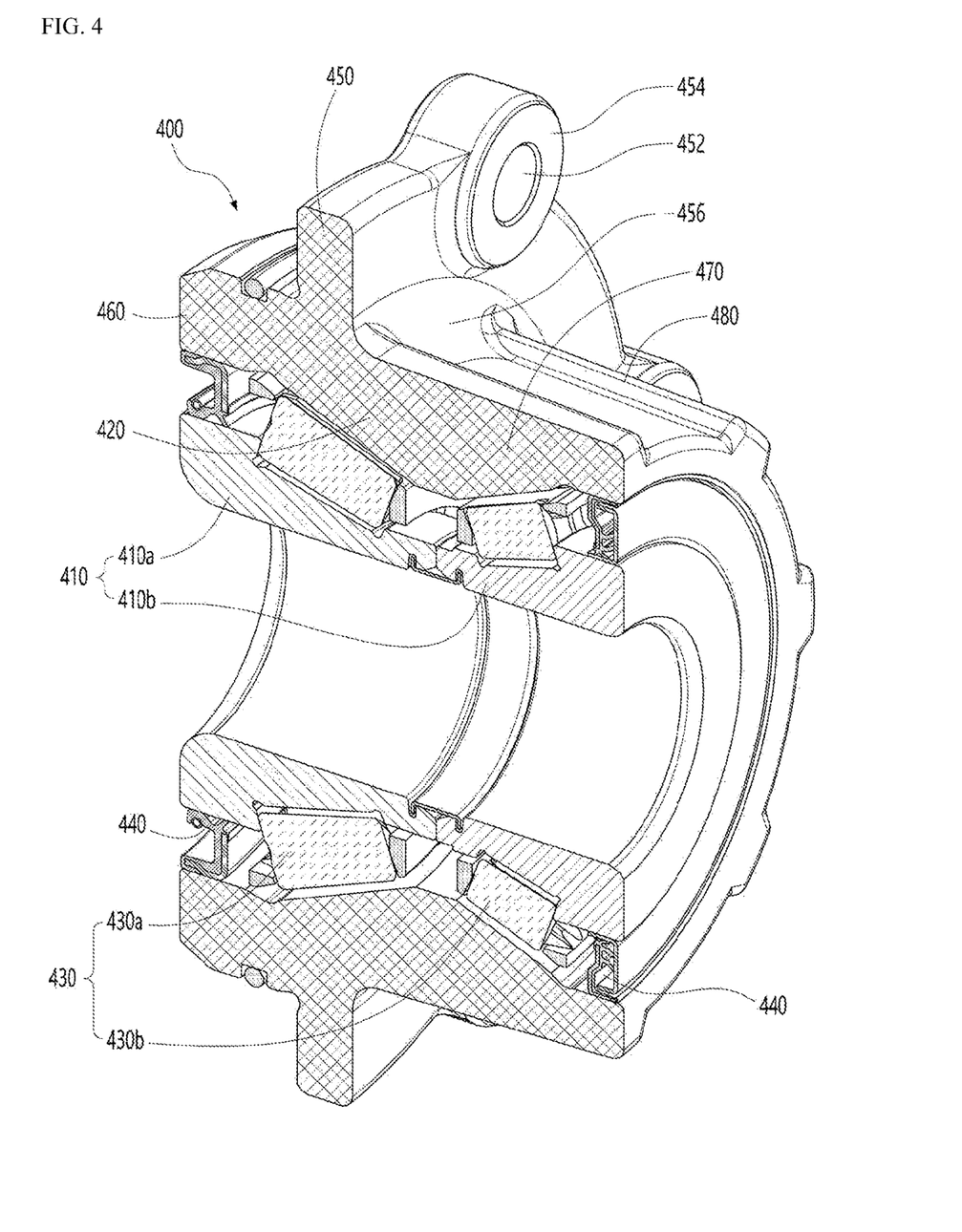
FIG. 4 exemplarily illustrates a structure of a pinion bearing according to an example embodiment of the present disclosure.

According to an example embodiment of the present disclosure, as illustrated in FIGS. 2 to 4, in order to secure more sufficient heat-dissipating capability, the heat dissipation fin 480 may be formed to extend from the flange portion 450 of the outer ring 420 to an axial end portion of the second extension portion 470.

According to an example embodiment of the present disclosure, a radial outer surface of the heat dissipation fin 480 may be formed to be inclined at a predetermined angle α with respect to a central axis of the pinion bearing 400. For example, according to an example embodiment of the present disclosure, as illustrated in FIG. 3, the radial outer surface of the heat dissipation fin 480 may be formed to be inclined at the predetermined angle α with respect to the central axis of the pinion bearing 400 such that it is closer to the central axis of the pinion bearing 400 as it is more distant from the differential gear unit 300.

With this configuration, the inclined structure of the radial outer surface makes it possible to easily separate the outer ring 420 from a mold. Thus, it is possible to easily manufacture the outer ring 420 through a forging process or the like.

According to an example embodiment of the present disclosure, in order to more easily separate the outer ring 420 from the mold, a portion in which the heat dissipation fins 480 are not formed on the radial outer surface of the outer ring 420 (that is, a radial outer surface of a portion in which the heat dissipation fins 480 are not formed in the second extension portion 470) may also be formed to be inclined at the predetermined angle α with respect to the central axis of the pinion bearing 400.

According to an example embodiment of the present disclosure, the predetermined angle α of the radial outer surface of the outer ring 420, which is inclined with respect to the central axis of the pinion bearing 400, may be in a range of 2 degrees to 3 degrees.

In the case of the example embodiment illustrated in FIGS. 2 to 4, the heat dissipation fins 480 provided on the outer peripheral surface of the outer ring 420 are illustrated to be formed to extend from the flange portion 450 to the axial end portion of the second extension portion 470, but the heat dissipation fins 480 may be modified in other structures.

Figure 5:
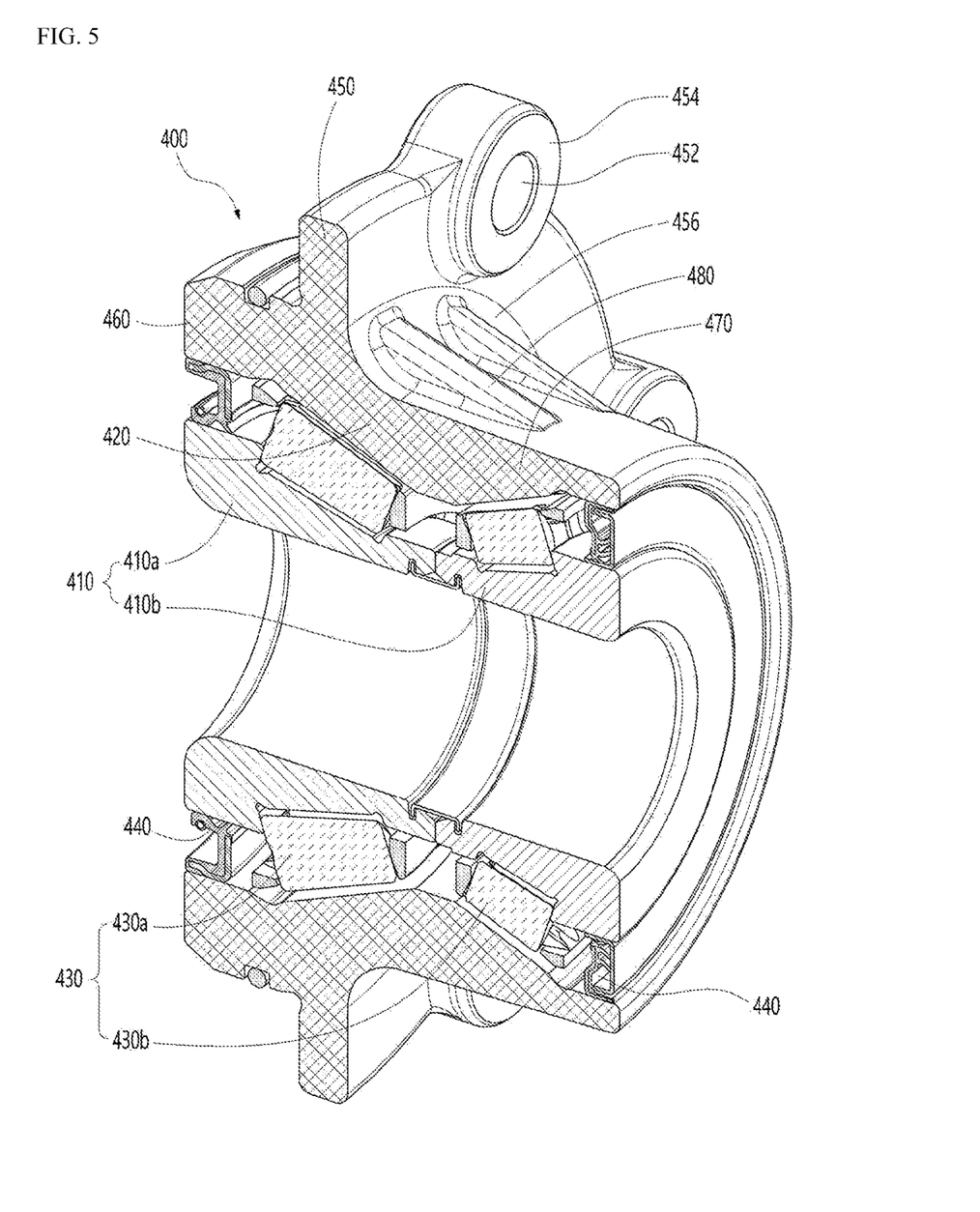
FIG. 5 exemplarily illustrates a structure of a pinion bearing according to another example embodiment of the present disclosure.

For example, referring to FIG. 5, a structure of the pinion bearing 400 according to an example embodiment of the present disclosure in which the heat dissipation fins 480 of the outer ring 420 are modified is exemplarily illustrated.

In the pinion bearing 400 illustrated in FIG. 5, the heat dissipation fins 480 provided in the outer ring 420 are formed to extend from the flange portion 450 to an intermediate portion of the second extension portion 470 (that is, to a portion between the flange portion 450 and the axial end portion of the second extension portion 470), unlike the example embodiments described above.

In the example embodiment illustrated in FIG. 5, other configurations than the heat dissipation fins 480 formed on the outer peripheral surface of the outer ring 420 may be the same as or similar to the example embodiments described above, and thus a detailed descriptions thereof will be omitted.

As described above, the pinion bearing 400 according to the example embodiment of the present disclosure may be separated into an individual part and may be configured to be coupled to the pinion shaft 200 and the differential gear unit 300 (that is, a plurality of single-row bearings are not coupled to the pinion shaft, but the pinion bearing is individually unitized by the outer ring having the flange portion provided on the outer peripheral surface thereof and raceways for a plural rows of rolling elements provided on the inner peripheral surface of thereof). It is therefore possible to further simplify the structures of the pinion bearing 400 and the differential arrangement 100 including the same, and achieve the miniaturization and weight-lighting.

Further, the pinion bearing 400 according to an example embodiment of the present disclosure comprises the heat dissipation fins 480 formed to protrude radially outward from the outer peripheral surface of the outer ring 420 to improve heat-dissipating capability. This makes it possible to more easily release heat generated inside the pinion bearing 400 to the outside. Thus, as described above, it is possible to prevent the thermal deformation or the like from occurring at the time of high-speed operation even if the case where the pinion bearing 400 is individually unitized as a separate part to provide grease lubrication.

In addition, the pinion bearing 400 according to an example embodiment of the present disclosure is formed in a structure in which the radial outer surface of the heat dissipation fins 480 provided on the outer peripheral surface of the outer ring 420 is inclined with respect to the central axis of the pinion bearing 400. This makes it possible to easily separate the outer ring 420 from the mold even if the outer ring 420 is formed by a forgoing process or the like. It is therefore possible to easily manufacture the outer ring 420 with a simple production process such as the forgoing process.

Although the present disclosure has been described above in terms of specific items such as detailed constituent elements as well as the limited example embodiments, they are merely provided to help more general understanding of the present disclosure, and the present disclosure is not limited to the above example embodiments. Various modifications and changes could have been realized by those skilled in the art to which the present disclosure pertains from the above descriptions.

Therefore, the spirit of the present disclosure need not to be limited to the above-described example embodiments, and in addition to the appended claims to be described below, and all ranges equivalent to or changed from these claims need to be said to belong to the scope and spirit of the present disclosure.

What is claimed is:

1. A pinion bearing, comprising:
   two inner rings each having an orbital plane formed on an outer surface of corresponding inner ring;
   an outer ring positioned outside the two inner rings in a radial direction and having two rows of orbital planes formed on an inner surface of the outer ring;
   a plurality of rolling elements configured to rotatably support the inner ring relative to the outer ring; and
   sealing members configured to be provided on both axial end portions of a bearing space in which two rows of rolling elements are located and seal the bearing space,
   wherein a bearing space in which the two rows of rolling elements are located is filled with a grease to provide a lubrication,
   wherein the outer ring comprises a flange portion formed to extend outward in the radial direction, a first extension portion formed to extend from the flange portion in one axial direction, and a second extension portion formed to extend from the flange portion in another axial direction,
   wherein a plurality of heat dissipation fins is formed on the second extension portion to protrude outward in the radial direction and are provided to be spaced apart from each other along a circumferential direction of the pinion bearing, and
   wherein the outer ring is formed of a single member.

2. The pinion bearing of claim 1, wherein each of the heat dissipation fins is formed to extend from the flange portion in an axial direction.

3. The pinion bearing of claim 2, wherein each of the heat dissipation fins is formed to extend from the flange portion to an axial end portion of the second extension portion.

4. The pinion bearing of claim 3, wherein a radial outer surface of each of the heat dissipation fins is formed to be inclined at a predetermined angle with respect to a central axis of the pinion bearing.

5. The pinion bearing of claim 4, wherein the radial outer surface of each of the heat dissipation fins is formed to be inclined at an angle of 2 degrees to 3 degrees with respect to the central axis of the pinion bearing.

6. The pinion bearing of claim 4, wherein a radial outer surface of a portion where each of the heat dissipation fins is not formed in the second extension portion is formed to be inclined at a predetermined angle with respect to the central axis of the pinion bearing.

7. The pinion bearing of claim 6, wherein the radial outer surface of the portion where the plurality of heat dissipation fins are not formed in the second extension portion is formed to be inclined at an angle of 2 degrees to 3 degrees with respect to the central axis of the pinion bearing.

8. The pinion bearing of claim 2, wherein each of the heat dissipation fins is formed to extend from the flange portion to a portion between the flange portion and an axial end portion of the second extension portion.

9. The pinion bearing of claim 1, wherein the flange portion comprises a plurality of fastening holes provided to be spaced apart from each other along a circumferential direction of the pinion bearing, and the plurality of fastening holes are formed to penetrate in an axial direction.

10. The pinion bearing of claim 9, wherein a mounting portion is provided around the plurality of fastening holes to protrude in the axial direction.

11. The pinion bearing of claim 10, wherein a weight loss portion having a smaller axial thickness than the mounting portion is provided on the flange portion.

\* \* \* \* \*